(12) United States Patent
Lilie et al.

(10) Patent No.: US 6,484,885 B1
(45) Date of Patent: Nov. 26, 2002

(54) SOLIDS RAISED SCREENS

(75) Inventors: Glenn T. Lilie, Pearland, TX (US); Fred B. Arehart, Pearland, TX (US)

(73) Assignee: CPI Sales & Mfg., Inc., Pearland, TX (US)

( * ) Notice: Subject to any disclaimer, the term of this patent is extended or adjusted under 35 U.S.C. 154(b) by 0 days.

(21) Appl. No.: 09/427,797

(22) Filed: Oct. 27, 1999

Related U.S. Application Data (63) Continuation-in-part of application No. 09/070,947, filed on May 1, 1998, now abandoned.

(51) Int. Cl.[7] .............................. B07B 1/46; B07B 1/28
(52) U.S. Cl. .................. 209/399; 209/254; 209/264; 209/269; 209/274; 209/275; 209/397; 209/401
(58) Field of Search .............................. 209/255, 236, 209/264, 274, 392, 397, 401, 408, 409, 411, 412, 415, 486, 395, 403, 275, 254; 210/498, 499

(56) References Cited

U.S. PATENT DOCUMENTS

| | | | | |
|---|---|---|---|---|
| 584,154 A | * | 10/1895 | Closz | 209/400 |
| 948,222 A | * | 2/1910 | Honabach | 209/397 |
| 1,082,612 A | * | 12/1913 | Smith et al. | 209/397 |
| 1,142,434 A | * | 6/1915 | James | 209/397 |
| 1,193,273 A | * | 8/1916 | Lee | 209/397 |
| 1,505,735 A | * | 8/1924 | Stebbins | 209/368 |
| 1,561,632 A | * | 11/1925 | Woodward | 209/397 |
| 2,172,551 A | * | 9/1939 | Symons | 209/392 |
| 2,374,775 A | * | 5/1945 | Parks | 209/395 |
| 3,513,973 A | * | 5/1970 | Grulke | 209/397 |
| 4,133,751 A | * | 1/1979 | Stengel | 209/274 |
| 4,465,592 A | * | 8/1984 | Nagl | 209/236 |
| 4,548,213 A | * | 10/1985 | Phillips et al. | 209/397 |
| 4,793,918 A | * | 12/1988 | Thomas | 209/467 |
| 4,820,407 A | * | 4/1989 | Lilie | 209/397 |
| 4,857,176 A | * | 8/1989 | Derrick et al. | 209/392 |
| 5,028,324 A | * | 7/1991 | Teinert | 210/232 |
| 5,211,291 A | * | 5/1993 | Kelley et al. | 209/680 |
| 5,330,057 A | * | 7/1994 | Schiller et al. | 209/392 |
| 5,876,552 A | * | 3/1999 | Bakula | 209/397 |
| 5,888,336 A | * | 3/1999 | Bakula et al. | 209/403 |
| 5,927,511 A | * | 7/1999 | Riddle et al. | 209/405 |

* cited by examiner

Primary Examiner—Donald P. Walsh
Assistant Examiner—Daniel K Schlak
(74) Attorney, Agent, or Firm—David M. Ostfeld (57) ABSTRACT

A new and unique design use of directional and re-directional raised ribs on a solids control filtering screen, such as those used in drilling wells for hydrocarbons and other substances, in conjunction with a coordinated system of hanging such screens and directing and redirecting the flow of trapped solids over the surface of such screens, is disclosed for use with a vibratory shaker. The invention counteracts the natural tendency of trapped solids to migrate to and congregate in the lowest areas of a suspended screen and facilitates a dryer fluids discharge, as well as more effectively utilizing the available screening surface area, and therefore the invention reduces the incidence of screen wear and tearing and increases the flow rate conductants and drying capabilities through the screen.

47 Claims, 12 Drawing Sheets

SOLIDS RAISED SCREENS

CROSS REFERENCE TO RELATED APPLICATIONS

This application is a continuation-in-part of U.S. application No. 09/070,947, filed May 1, 1998, by Glenn Lilie and Fred B. Arehart, entitled "Solids Screens", now abandoned.

TECHNICAL FIELD

The invention relates to screens used to filter and control solids, such as screens used to remove solids from drilling mud used in drilling wells such as hydrocarbon wells. More specifically, the invention relates to a design for fluids directional and re-directional system for use with screens and flow direction, preferably with diagonal or other flexible ribs which reduces the build-up of solids on particular areas of the screen, which build-up would otherwise reduce flow rate and increase the propensity of the screen to tear or rip.

BACKGROUND ART

Figure 1:
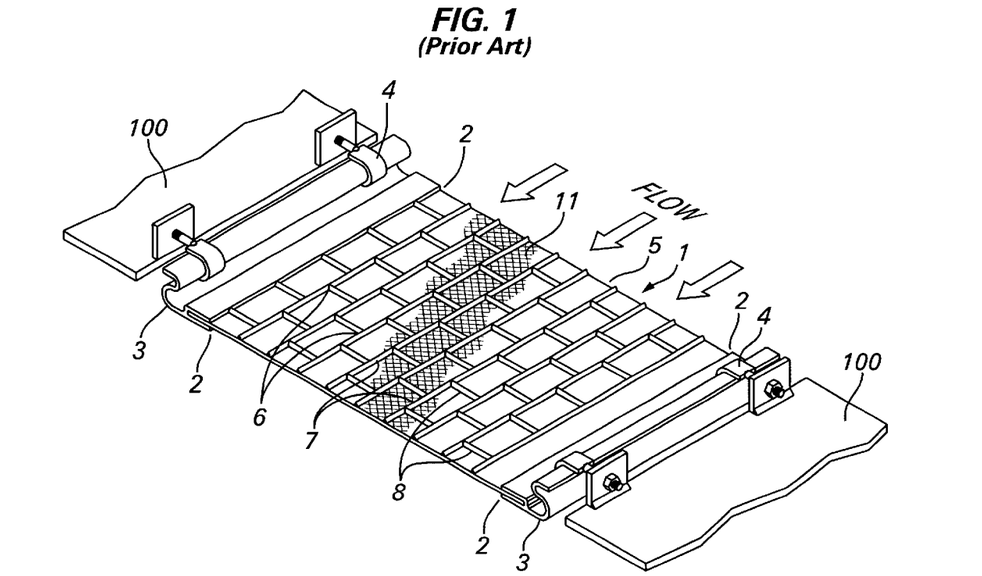
FIG. 1 is a depiction of a screen 1 as typically constructed in the prior art, viewed from above. The screen 1 is hung or suspended as follows: the two opposite longitudinal edges 2 of screen 1 are tightly held along their entire lengths by hooking clasps 3, which in turn are inserted into hooks 4 in order to hang or suspend screen 1.

The need for solids control, such as in conjunction with the use of drilling mud in hydrocarbon well drilling, has long been known in the prior art. Drilling mud, typically a mixture of clay and water and various additives, is pumped through the hollow drill string (pipe, drill collar, bit, etc.) down into the well and is ejected through holes in the drill bit. Among other functions, the mud picks up cuttings (rock bits) and other solids from the bottom of the well and carries these solids away from the bit as the mud is pumped upward and out of the well in the space between the well walls and the drill string. At the top of the well, the solids-laden mud is directed to the shale shaker, a device consisting essentially of a series of screens which catch and remove the solids from the mud as the mud passes through the screens. As indicated in FIG. 1, each screen is caused to vibrate by vibratory equipment generally shown by the indicator 100 in such a manner as to create a longitudinal flow of trapped solids in either direction on the top surface of the screen for removal and disposal of the solids. This filtering, along with other cleaning processes, allows the mud to be reused.

Figure 2:
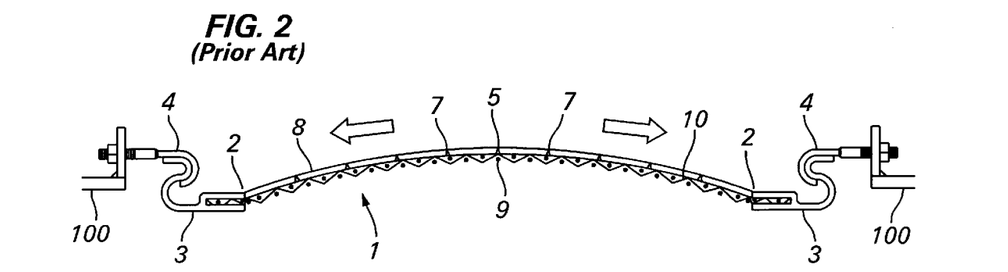
FIG. 2 is a horizontal and lateral view of screen 1 in an "over slung" position as explained above, describing the lateral flow of solids on the top surface of screen 1 as constructed using prior art.
Figure 3:
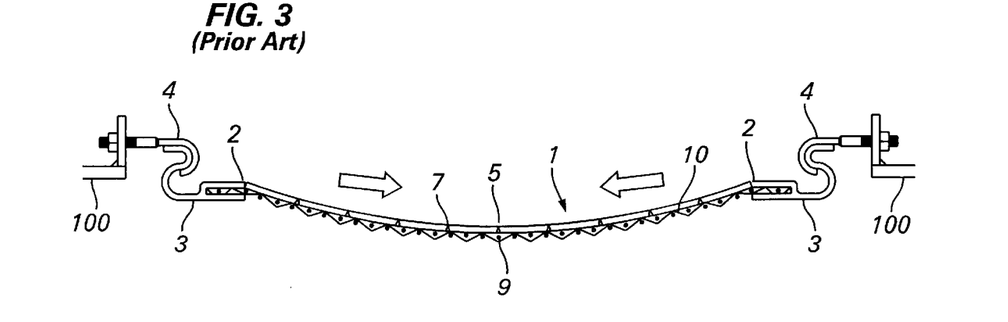
FIG. 3 is a horizontal and lateral view of screen 1 in an "under slung" position as explained above, describing the lateral flow of solids on the top surface of screen 1 as constructed using prior art.

The fineness or coarseness of the mesh of a screen may vary depending upon such factors as flow rate and the size of the solids to be filtered by the screen. The finer the mesh, the higher is the propensity of the screen to tear. Referring now to the drawings, this propensity to tear is further increased by the tendency of solids trapped by the screen 1 to laterally migrate (by the vibration of the screen) to and congregate at the lowest part of the screen 1, which is suspended as shown in FIG. 1. It is virtually impossible to hang a screen 1 so that the lateral plane of its surface is perfectly horizontal; rather, either the center 5 of screen 1 bulges upward laterally from the longitudinal edges 2 of screen 1 as shown in FIG. 2, in which case the screen is said to be "over slung", or the center 5 bulges downward as shown in FIG. 3, in which case the screen 1 is said to be "under slung". If screen 1 is over slung (FIG. 2), solids tend to congregate at the longitudinal edges 2; if screen 1 is under slung (FIG. 3), solids tend to congregate at center 5.

Screen 1 may comprise a single layer or, as shown in FIGS. 2, 3, 5, and 6 for illustration, two or more layers, the bottom screen layer 9 having a coarser, stronger mesh to provide support for one or more top screen layers 10 which are primarily responsible for the solids filtering function. Top screen layer(s) 10, being of a finer mesh, is the more prone to tearing.

As a means to limit screen tearing and to otherwise strengthen and support screen 1 and to hold screen layers 9 and 10 together, it is known in the prior art to construct screens with flexible ribs 6 of polypropylene or similar material. As shown in FIG. 1, these ribs 6, which generally vary in width from $3/16$ inch to $5/16$ inch, generally comprise a set of longitudinal ribs 7 running the entire length of screen 1 paralleling longitudinal edges 2), and shorter lateral ribs 8 running between and perpendicular to adjacent longitudinal ribs 7, spaced at regular intervals. Each set of lateral ribs 8 running between the same two longitudinal ribs 7 is staggered with adjacent sets of lateral ribs 8, thereby creating a brickwork pattern of ribs 6. Ribs 6 are of approximately the same thickness as the screen 1 itself (approximately 0.036 inch) and enclose the full thickness of both bottom screen layer 9 and top screen layer(s) 10. The intersecting of longitudinal ribs 7 and lateral ribs 8 create panels 11 of screen; a tear in top screen layer(s) 10 beginning in any particular screen panel 11 is prevented from spreading to adjacent screen panels 11 by the ribs 6 that form the edges of the panel 11 in which the tear occurs.

A different, superior pattern of ribs 6 is also known in the prior art which counteracts the tendency of trapped solids to flow laterally to the lowest parts of a suspended screen. See U.S. Pat. No. 4,820,407, to Kenneth Lilie, issued Apr. 11, 1989. It reduces the incidence of screen tearing, increases the filtering surface area of the screen, and enhances the longitudinal flow of trapped solids across the top surface of the screen.

Figure 4:
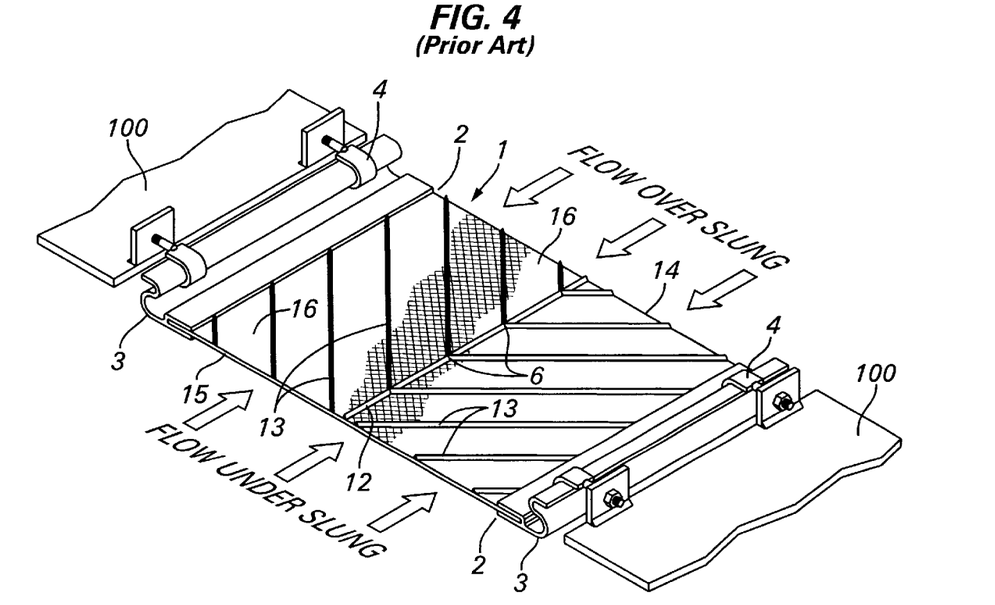
FIG. 4 is the same illustration as FIG. 1, except that screen 1 is shown embodying a different configuration as described above.
Figure 5:
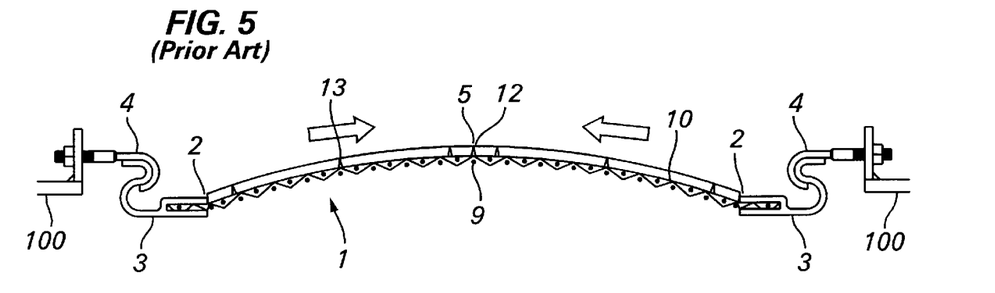
FIG. 5 is a horizontal and lateral view of screen 1 of FIG. 4 in an "over slung" position , describing the effect on the lateral flow of solids on the top surface of screen 1.
Figure 6:
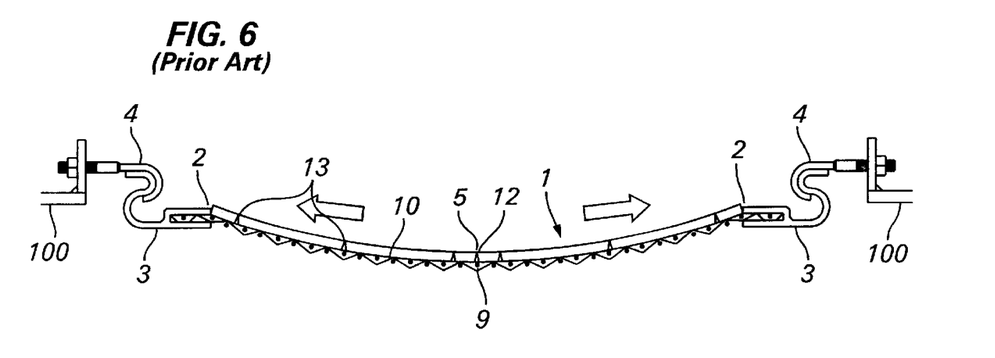
FIG. 6 is a horizontal and lateral view of screen 1 of FIG. 4 in an "under slung" position, describing the effect on the lateral flow of solids on the top surface of screen 1.

Reference numerals 2, 3, 4 and 100 and the parts thereof have the same meaning for FIGS. 4–6 as they do for FIGS. 1–3. As indicated in FIGS. 4–6, screen 1 has edges 2 connected to hooking clasp 3. Hooking clasps members are engaged by clamps 4 to vibratory equipment generally shown by the reference numeral 100. Referring now to FIG. 5, the pattern of ribs 6 comprises a single longitudinal center rib 12 extending the full length of screen 1 and, on either side of center rib 12, a set of diagonal ribs 13. Each set of diagonal ribs 13 comprises a series of equally spaced and parallel diagonal ribs 13, each rib 13 beginning laterally at the longitudinal edge 2 corresponding to such set of diagonal ribs 13 and extending diagonally to center rib 12. (At the lateral edges 14 and 15 of screen 1, some diagonal ribs 13 are cut off before actually reaching longitudinal edges 2 or center rib 12 or imaginary extensions thereof, but otherwise are situated the same as and are parallel to full diagonal ribs 13.) For each diagonal rib 13 of one set of diagonal ribs 13, there is a corresponding and mirroring diagonal rib 13 of the other set of diagonal ribs 13, beginning at the other longitudinal edge 2 and extending diagonally and laterally in the same longitudinal direction and ending at the same point on center rib 12 as its corresponding diagonal rib 13 of the other set of diagonal ribs 13. The thickness of ribs 12 and 13 is greater than the thickness of screen 1 (whether comprising a single layer-or multiple layers), and so in addition to fully enclosing the thickness of bottom screen layer 9 and top screen layer(s) 10, ribs 12 and 13 are slightly raised above the top surface of screen 1, such as 0.007 inch above said surface. (Optionally, the entire screen 1 may be bordered with ribs 6 of like construction in order to strengthen the screen 1.)

Screen 1 is intentionally either over slung (FIG. 5) or under slung (FIG. 6). If screen 1 is over slung, then, referring to FIG. 4, the longitudinal flow of trapped solids is directed over the top surface of screen 1 from the far lateral end 14 longitudinally of screen 1 to the hear lateral end 15. Because ribs 12 and 13 form a slightly raised barrier in relation to top screen layer(s) 10, diagonal ribs 13 tend to cause trapped solids to move laterally from longitudinal edges 2 to center 5 of screen 1, thereby counteracting the tendency of solids to congregate at longitudinal edges 2 of an over slung screen (FIG. 5). If, on the other hand, screen 1 is under slung, then, again referring to FIG. 4, the longitudinal flow of trapped solids is directed from near lateral end 15 of screen 1 to far lateral end 14, in which case diagonal ribs 13 tend to cause trapped solids to move laterally from center 5 to longitudinal edges 2, thereby counteracting the tendency of solids to congregate at center 5 of an under slung screen (FIG. 6).

The pattern of the screen in U.S. Pat. No. 4,820,407 under field tests shows that the pattern of screen 1 (in most cases) does exhibit the tendency for the mud to be directed along the diagonal rib pattern toward the center of the screen.

Further, all models of hooked type shale shaker equipment normally have rib rail reinforcements positioned on the screen beds for the existing equipment. One purpose these ribs serve is to support the screen panel size span as it becomes engaged in a vibrating action to perform the function of screening or separating. These ribs are normally made of steel, run the length of the screen bed, and are reinforced with differing substances to cushion the screens underside from the metal rib.

During normal operation of the shale shaker, the cushion reinforcement will wear due to the effects of the equipment's vibrating motion. As this reinforcement wears, it leaves an impression in the screen and will eventually cause the screen to wear if the reinforcement wears unevenly or becomes brittle and cracks, or wears out, leaving the underside of the screens surface resting against the metal ribs. If the cushion reinforcement methods are not changed on a regular basis, the associated screen life will be detrimentally affected.

DISCLOSURE OF THE INVENTION

The invention comprises an improved fluids directional and redirectional system used in conjunction with filtering screens of any type, such fluids directional and redirectional system being directed towards the discharge end of the screen. Such fluids directional and redirectional system may also be in the center of the screen or may have a combination of both types. The screen may be comprised of two opposing sets of raised directional diagonal ribs of various lengths, each set of various lengths comprising series of equal or unequally spaced and parallel ribs. The screen may have raised director ribs of various lengths disposed along the screen.

The raised, spaced apart director ribs may be spaced apart from each other along any angle of a screen to permit gates to exist between the channeling ribs. These director ribs may then be spaced such that the next adjacent director ribs to gate or opening are across the flow path for that gate or opening.

The screens may also have a rib rail cushion support within the screen body, formed by plastic melted and laminated into the screen assembly at the points in the screen surface where the impact points of the rib rail reinforcements of the shale shakers will make contact with the rib rail cushion of the screen.

BRIEF DESCRIPTION OF THE DRAWINGS

To best illustrate and describe the nature and objects of the present invention, it is necessary to make reference, in the statement of "Background Art" which immediately precedes as well as in the "Detailed Description of the Invention", to the drawings. Therefore, the drawings are briefly described here along with a brief description of pertinent parts, each of which is given the same reference number in all the drawings in which such part appears.

DESCRIPTION OF THE INVENTION

Figure 7:
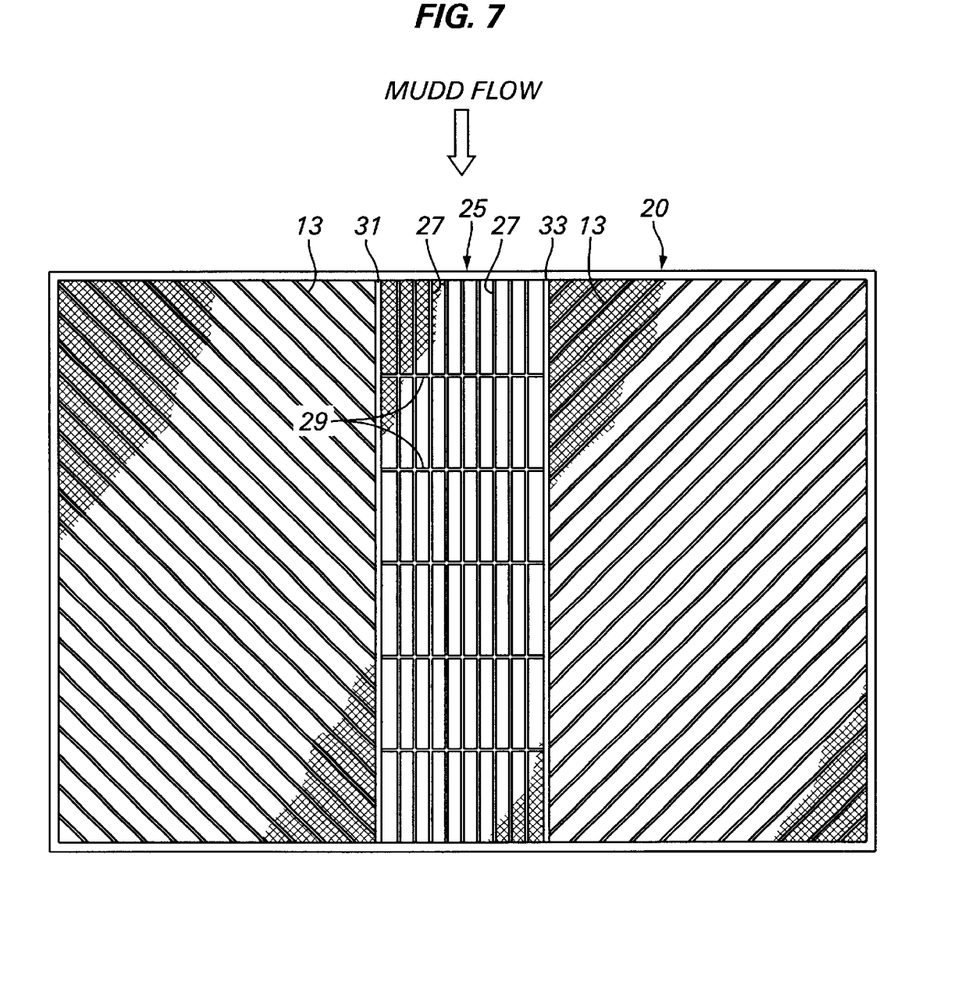
FIG. 7 is a plan view of screen 20 of the preferred embodiment of the present invention.

Referring to FIG. 7, there is shown a screen 20 similar to screen 1 except that it has a center portion 25. Center section 25 of screen 20 comprises longitudinal ribs 27 extending the full length of screen 20 and traversed by lateral ribs 29.

Lateral ribs 29 extend from one boundary rib 31 to a second boundary rib 33, each of which extend in the same manner as ribs 27 but may be thicker than ribs 27. Diagonal ribs 13 terminate with boundary ribs 31, 33. Screen 20 will connect vibratory equipment 100 in the same manner as shown in FIG. 4. The screen 20 would be placed with regard to the mud flow as set out in FIG. 7. Ribs 27, 29, 31 may be arranged to be rectangular in shape of varying sizes, both width and length, and are positioned at the center area of screen 20, to permit a continued flow of drilling mud. The flow of drilling mud is enhanced because of the larger screen 20 open area in center portion 25 allowing for more throughput.

Figure 8:
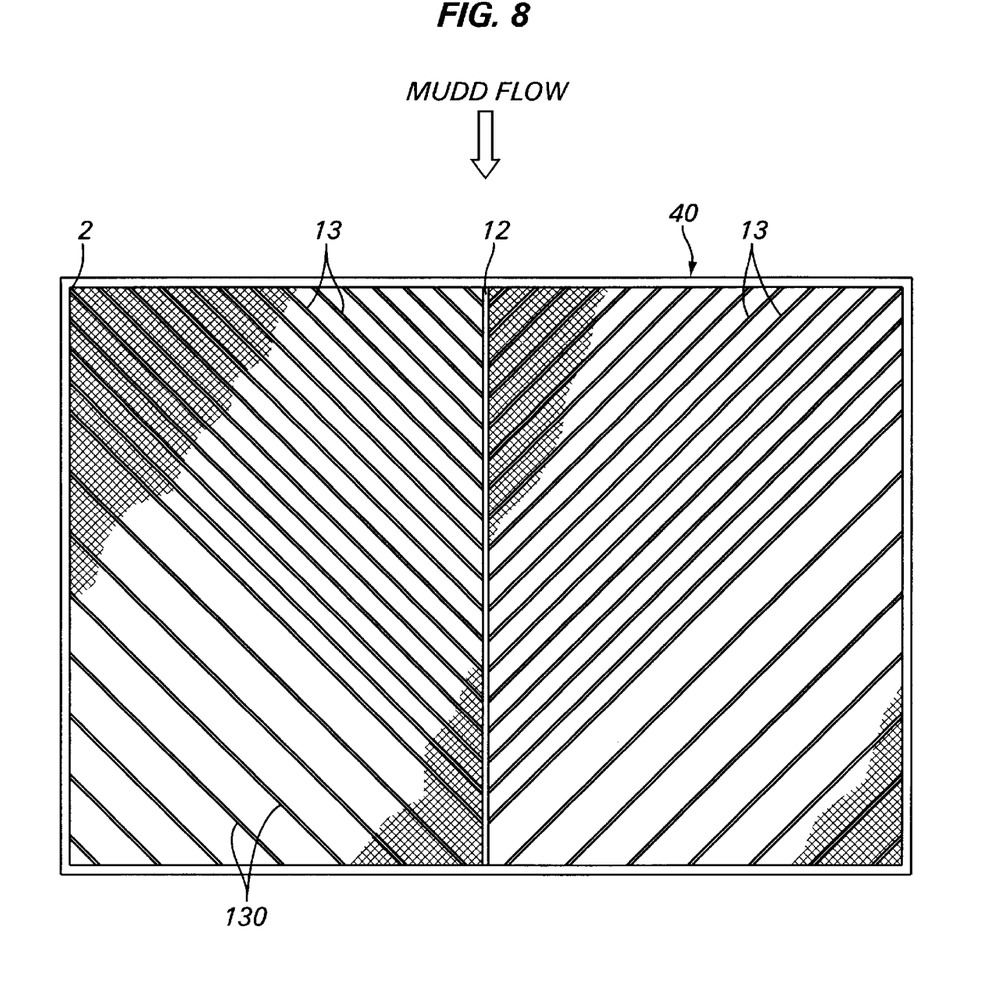
FIG. 8 is a plan view of a screen 40 of the preferred embodiment of the present invention.

As shown in FIG. 8, an alternative screen 40 may be used having a series of diagonal ribs 13 and a single longitudinal center rib 12. The center rib 12 extends the fill length of screen 40. On each side of center rib 12 is a set of diagonal ribs 13. Each set of diagonal ribs 13 comprise a series of unequally spaced and parallel diagonal ribs 13, each rib 13 beginning laterally at the longitudinal edge 2 corresponding to each set of diagonal ribs 13 and extending diagonally to center rib 12. In this manner, the "V" pattern configuration is designed in variable intervals. The top of the screen, with the mud flow shown as in FIG. 8, has a closer pattern for additional support as the mud is initially dropped on the screen intake end and then the pattern opens to a larger "V" as the mud flows and distribute over the entire screen area, thereby preventing screen blinding, due to the larger open area allowing for more throughput. Thus, ribs 130 have a significantly larger spacing between themselves than ribs 13. The ribs 13, 130 may each have variable spacing from each other or may be grouped in spacing intervals as shown in FIG. 8.

Figure 9:
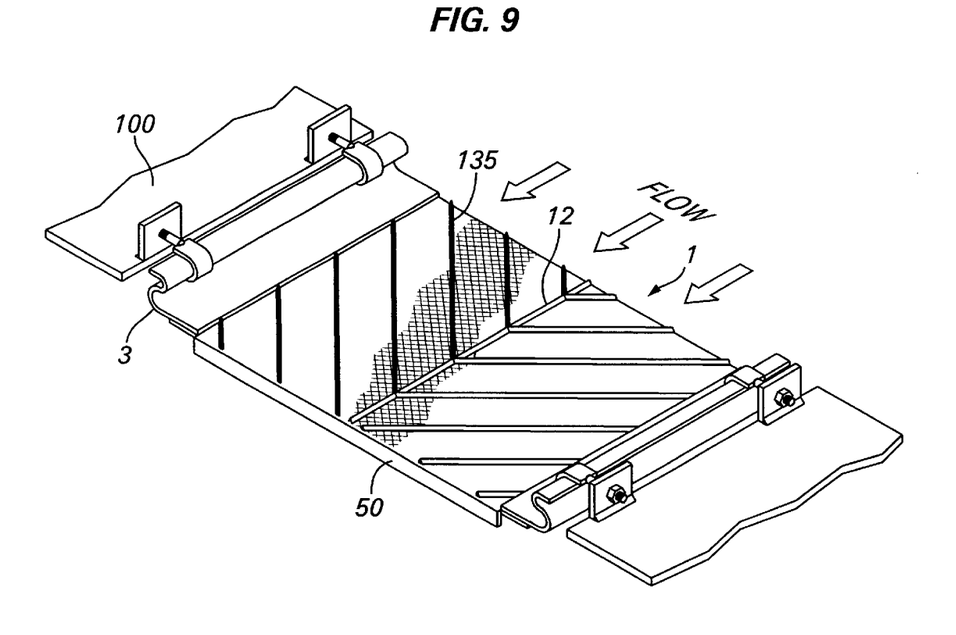
FIG. 9 is a depiction of a screen 1 viewed from above having a fold of the preferred embodiment of the present invention.

Referring to FIG. 9, there is shown a screen 1 of the type of FIGS. 4–6 with any spaced diagonal rib 135. Screen 1 could also be any other screen of the prior art or of any later developed screen, including the screen shown in FIGS. 1–3 and the preferred embodiments of FIGS. 7 and 8. Attached to screen 1 is a full width, 90-degree reinforced fold 50 from the screen 1 discharge end, which is perpendicular to the side hook strips 3. The fold 50 extends downward from the screen discharge end of screen 1 from the screen upper surface approximately one inch. The fold 50 is a solid continuation of the border margin of the screen pattern on the discharge end of the screen 1. The fold 50 represents a solid, rigid extension of the screen 1 to permit a stiffening of the screen 1 discharge end to facilitate a more efficient solids runoff from the screen surface discharge end, either onto the next screen (not shown) or off all screening into a discharge area (not shown). The reinforced stiffened area created by the fold 50 will prevent screen 1 tearing resulting from a loosened screen area prone to excessive movement. Thus, screen 1 tears that would normally result from a loosened screen area would be prevented. The direction of flow is as shown in FIG. 9 so that the fold 50 is on the discharge end.

Figure 10:
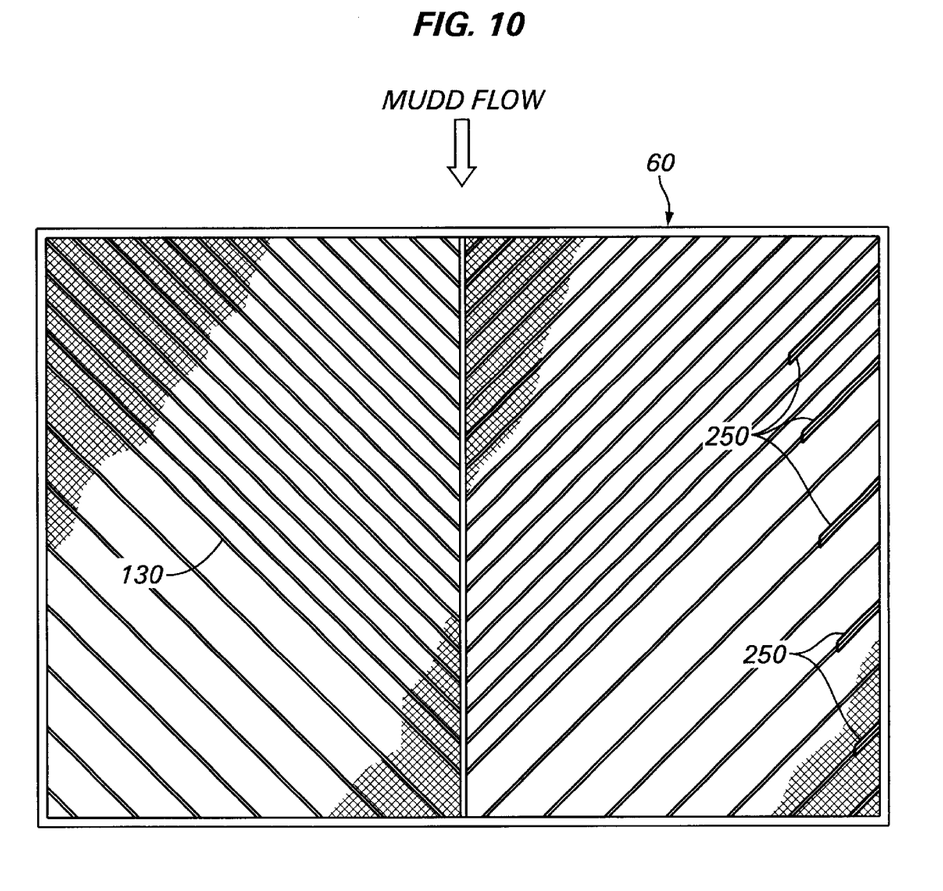
FIG. 10 is a plan view of a screen 60 of the preferred embodiment of the present invention showing raised director ribs of an unequal size as they run the length of the screen from the top to the discharge end which may be on both screen sides, and a sequence of increasing diagonal ribs spacing moving to discharge end.
Figure 11:
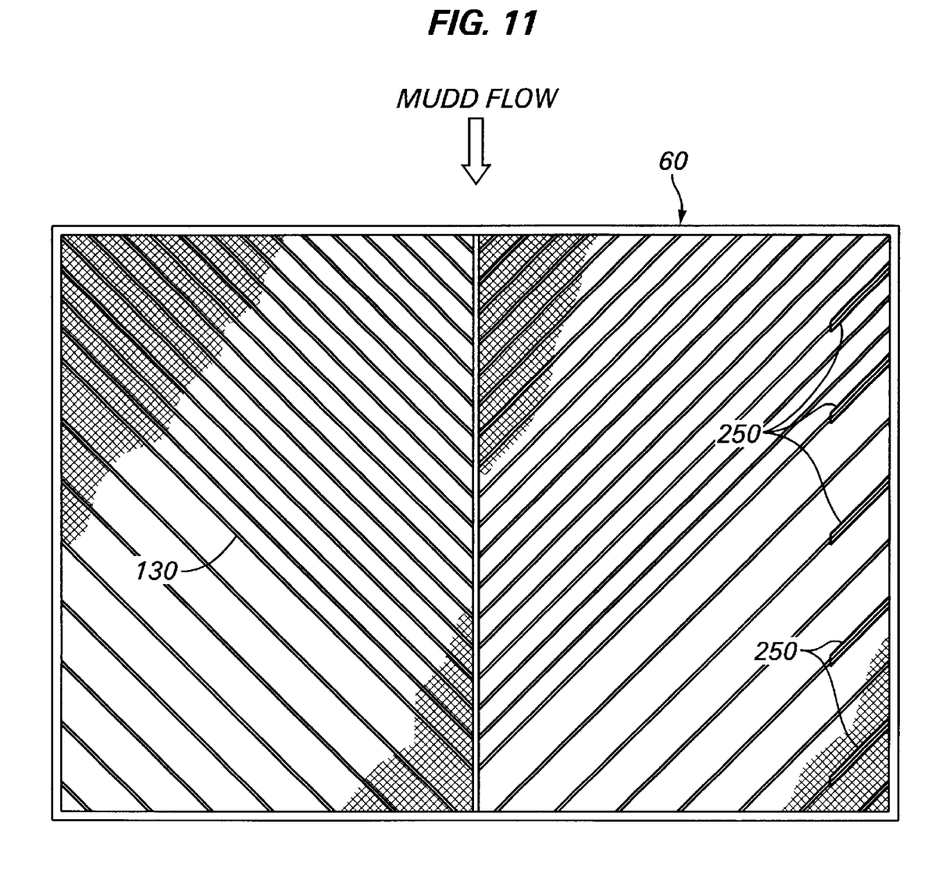
FIG. 11 is a plan view of a screen 60 of the preferred embodiment of the present invention showing raised director ribs the length and spacing of which may be on both sides of the screen, and a sequence of increasing diagonal ribs spacing moving to discharge end.
Figure 12:
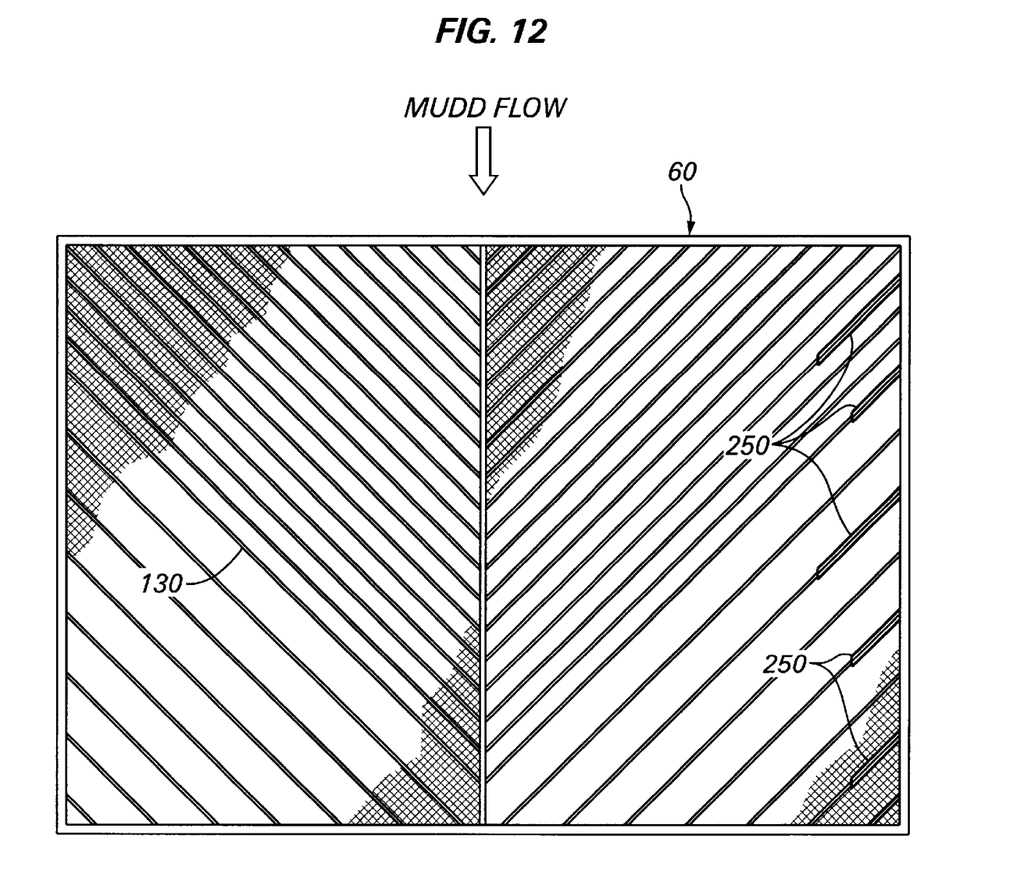
FIG. 12 is a plan view of a screen 60 of the preferred embodiment of the present invention showing raised director ribs of alternating sizes.
Figure 13:
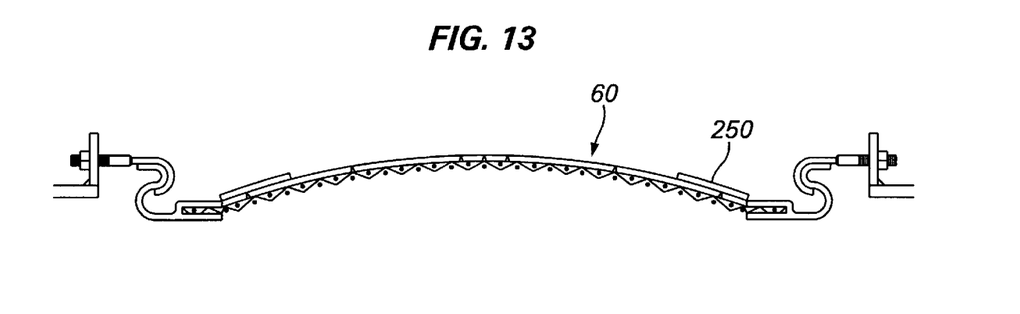
FIG. 13 is a side view of any of FIGS. 10–12.

As shown in FIGS. 10–13, the diagonal ribs 130 of any screen of the prior embodiments, or any other screen of the prior art, may have one or more raised director ribs 250. These ribs 130 may be in a variety of positions. Raised director ribs 250 may be located on diagonal ribs 130 and on screen 60 may be of equal length and spacing as shown in FIG. 10 and may be present on both sides of the screen 60 rather than just one side as shown in FIG. 10 or the raised director ribs 250 may be of descending size as they run the length of the screen 60 from the top to the discharge end as shown in FIG. 11 and may be present on both sides of the screen 60 rather than just one side as shown in FIG. 11 or the raised director ribs 250 may be of unequal lengths, and staggered, starting from the top of the screen 60 and alternating as the raised director ribs 250 run from the top of the screen 60 to the discharge end as shown in FIG. 12 and may be present on both sides of the screen 60 rather than just one side as shown in FIG. 12. In all these cases, the raised director rib 250 may be used as part of the screen shaking surface as shown in FIG. 13. The raised director ribs 250 are made of a high temperature, polypropylene, fusion welded to existing ribs on the screens top surface with the diameter ranging from ³⁄₁₆ inch to ¼ inch. The raised director ribs 250 usually only run a portion of the full length of diagonal rib 130. The raised director ribs 250 are attached to the top of the screen 60, diagonal ribs 130 by use of a thermal fusion weld, preferably.

The embodiment of the present invention as explained above causes a significantly more even distribution and redistribution of trapped solids on the top surface of screens 1, 20, 40, 60 thereby reducing the incidence of screen tearing at areas of screens 1, 20, 40, 60 where solids would otherwise tend to congregate. Also, the more even spreading of trapped solids allows a greater flow and a quality retention time of fluid cuttings through screens 1, 20, 40, 60 for two reasons: (1) there is less surface blockage caused by congregating solids, (2) the longitudinal flow of trapped solids over and off screens 1, 20, 40, 60 or otherwise through the center of screen 20 is enhanced and (3) facilitate more effective use of available screen surface area.

Figure 14:
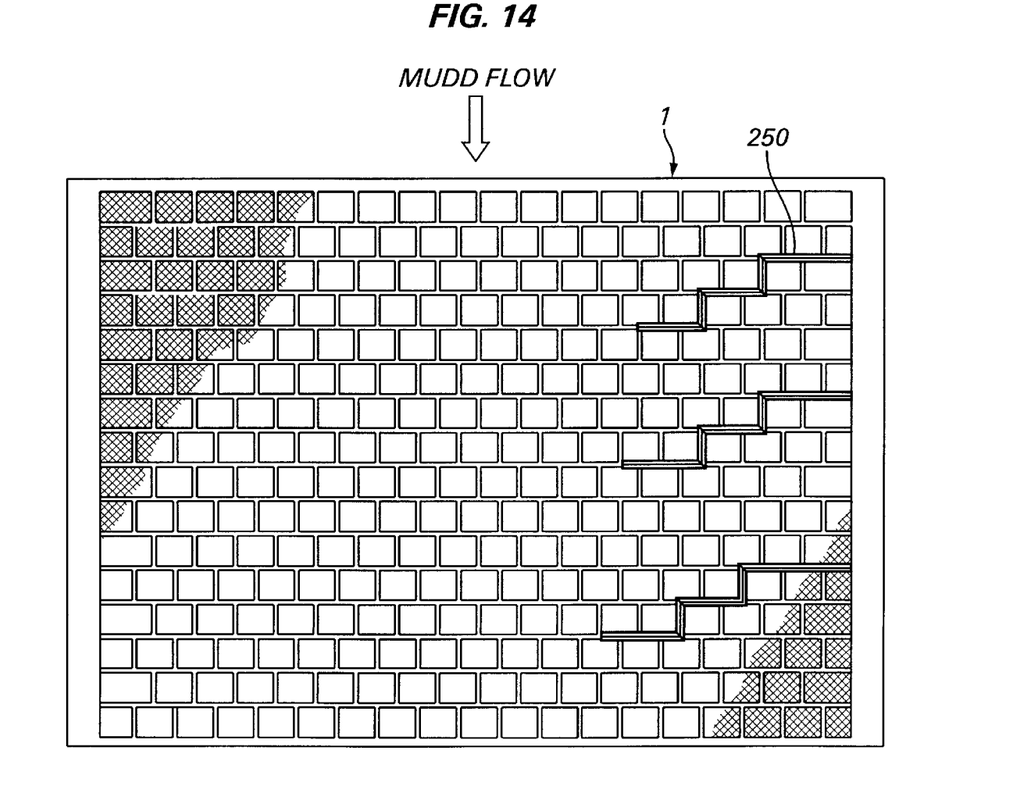
FIG. 14 is a plan view of a screen of an alternate embodiment of the present invention with raised director ribs of an alternating horizontal/vertical configuration.

As shown in FIG. 14, and as applicable to the screens 1 of the prior art, and also, for example, FIGS. 10–13, a screen 1 which is a typical two inch by two inch square pattern has mud directors 250 applied by, for example and preferably, a fusion weld, to the surface bonded face of the screen 1. These mid directors 250 are diagonal in nature. The surface applied mud directors 250 direct the mud flow to the center of the screen 1 and improve the cutting distribution to achieve a more efficient screening and to overcome the natural tendencies of the crown type machine to throw/force the cuttings (not shown) to the side of the screen 1. The mud directors 250 are, preferably, fusion welded applied polypropylene, ¼ inch tall and of varying lengths and patterns that are positioned on the surface of the oilfield drilling screens 1, 20,40, 60 to direct and redirect drilling mud slurries.

At the top or intake end of primary screen 1, 20, 40, 60 (feed screen) on a shaker 100 takes the full flow of the cuttings and mud as they are dumped onto the feed screen to begin the process of separation of the cuttings from the drilling mud. The higher this separation process can happen on the feed screen 1, 20 40, 60 the more recovery of drilling mud is accomplished and the cuttings are then allowed to move down the screen 1, 20, 40, 60 surface for drying until they are ultimately discharged on the end screen 1, 20, 40, 60.

Strategic placement of mud directors 250 on the primary screen 1, 20, 40, 60 are helpful in accomplishing this primary separation and drilling mud handling capabilities. When the slurry (cuttings and mud) hit a mud director 250, the cuttings follow the line of the mud director 250, drilling fluids rush over the mud director and better able to re-circulate through the screen 1, 20, 40, 60 as a result of the separation occurring at the point of the mud director 250. The screen area immediately behind the mud director 250 becomes an "eddy" for the drilling mud to flow through the screen 1, 20, 40, 60 unimpeded by cuttings. Placement of additional mud directors 250 on the face of the screen 1, 20, 40, 60 create numerous areas for better fluid throughput.

After a primary separation of cuttings and fluids on the feed screen 1, 20, 40, 60, the cuttings separation continues as the slurry must move down the screen surface before being discharged. The dryer the cuttings become in this process, the more screen utilization becomes maximized and result in dryer cuttings. The dryer cuttings allow for a more efficient and less expensive disposal cost of the cuttings (cuttings must be removed from the job site by being hauled away) for disposal and reduce drilling mud loss.

The placement, length, and direction (angle) of mud directors 250 are able to increase the retention time cuttings are actually on a screen surface. This additional time allows for the increase in cutting dryness. Mud directors 250 are strategically positioned on the screen 1, 20, 40, 60 surface to purposefully increase cuttings retention time. The mud directors being placed at an angle and at increased length means the cuttings must follow the path of the mud directors 250 in the vibrating process. As the path of the mud directors 250 is not a straight line, the movement takes longer to exit the screen and thereby increase the retention time on the screen surface and yield a dryer cutting and separation higher on the screen.

Standard solids control equipment 100 is built with a crown deck. This means the deck is higher at the center point than at the side points as discussed above. This inherent characteristic means that as a drilling slurry hits the screen surface, the slurry has a tendency to migrate to the sides of the screen. The side migration produces a tendency known as a "horseshoe effect". The "horseshoe effect" is so called because it resembles a horseshoe. The sides of the horseshoe are drilling slurries at the side of the screens that are not being separated and this results in significant mud loss as they are allowed to migrate down the sides of the screens to discharge. The mud directors 250 when placed along the sides of the screens 1, 20, 40, 60 overcomes this horseshoe effect and redirects the slurry back to the screen's center for a better fluid/cuttings distributions and more efficient screening. This contrast to other attempts to overcome the horseshoe effect involving the use of a flat screen, three-dimensional screen and pre-tension screen on special types of equipment which are all very expensive and require additional equipment.

Figure 15:
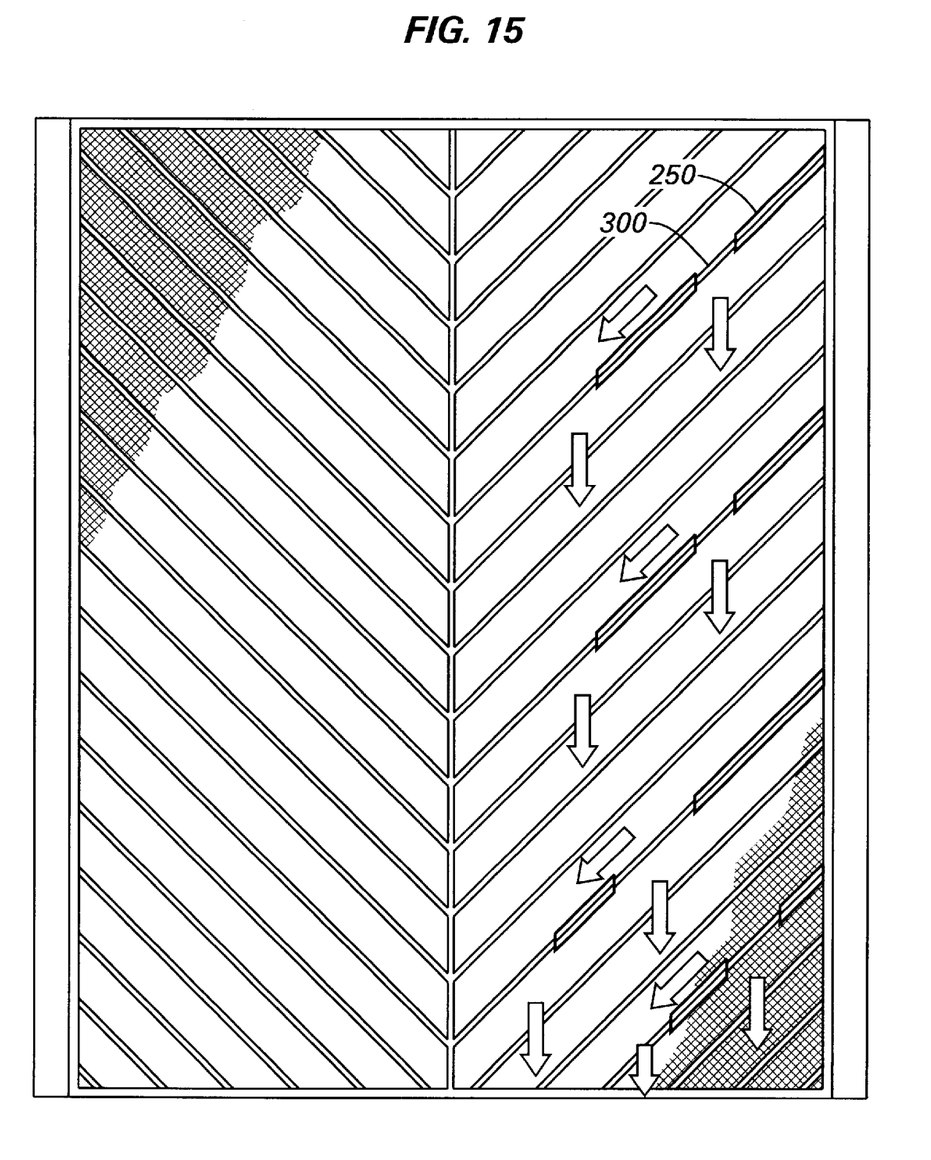
FIG. 15 is a plan view of a screen of a second preferred embodiment of the present invention.

As shown in FIG. 15, mud directors 250 are transformed into being a combination of mud directors 250 with mud gates 300. The mud gates 300 are voided areas long the lines of the mud directors 250. This configuration can be used for any of the screens 1, 20, 40, 60. In FIG. 15, a v-screen is used. The v-mud gates 300 permit drilling mud to flow through the voided areas 300 after being directed to the void 300 by mud directors 250. This prevents the mud from building up along the mud directors 250 permitting a better fluid/cutting distribution and eliminates screen wear that may occur. Subsequent (downstream) v-mud gates 300 are positioned at specific points along other mud directors 250 to enhance the fluid/cutting distribution to allow for increased cutting retention time on the screen 1, 20, 40, 60, thus producing a dryer cutting. Thus, the drilling mud no longer follows the direction of the screen surface with no method to direct or redirect to achieve increased retention cutting time. Accordingly, the shale shaker machine 100 is not the primary responsible equipment for the retention time. The v-pattern with mud directors 250 and v-mud gates 300 overcomes the natural tendency of crown type machines 100 to send the drilling mud fluids to the sides of the screen 20, 40, 60 producing the tendency known as "horseshoe effect". The v-mud directors 250 and v-mud gates 300 neutralize the effect of the crown type machine 100 by directing the mud flow away from the sides and toward the center of the screen 20, 40, 60, such as v-screen 60, and while on the v-mud directors 250, the v-mud gates 300 permit the drilling fluid to flow down the screen 20, 40, 60 for better drying by increased screening and redirection for dryer and increased retention time on the screen, such as screen 60. The intentional voids, v-mud gates 300, along the lines of the v-mud directors 250 produce the gate effect. The v-mud gates 300 can be of different lengths and different positioning dependent upon the screen type, size and configuration, as is the case for the v-mud directors 250, which maybe located across the flow line from the adjacent mud gate 300.

Figure 16:
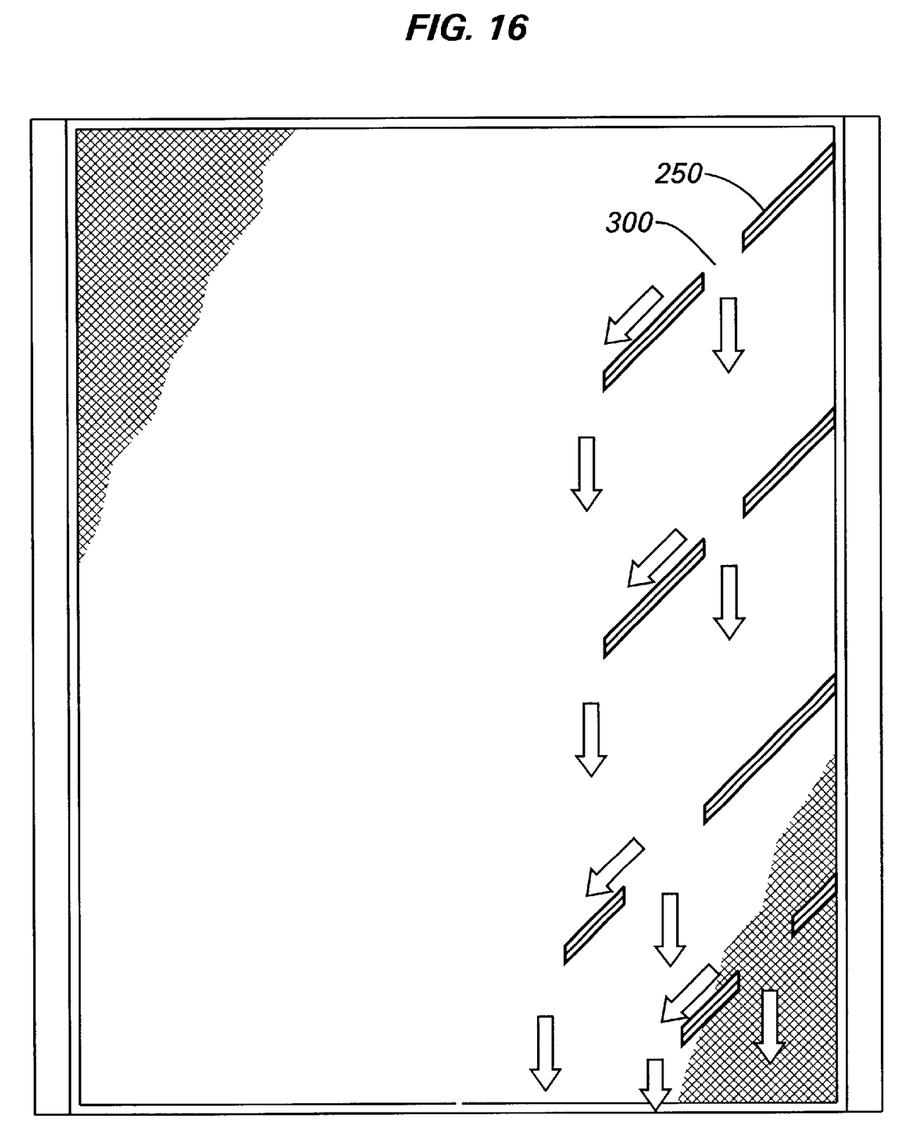
FIG. 16 is a plan view of a screen of a third preferred embodiment of the present invention.

FIG. 16 illustrates the use of the mud directors 250 and mud gates 300 with a plain screen, rather than a v-screen 20, 40, 60.

Figure 17:
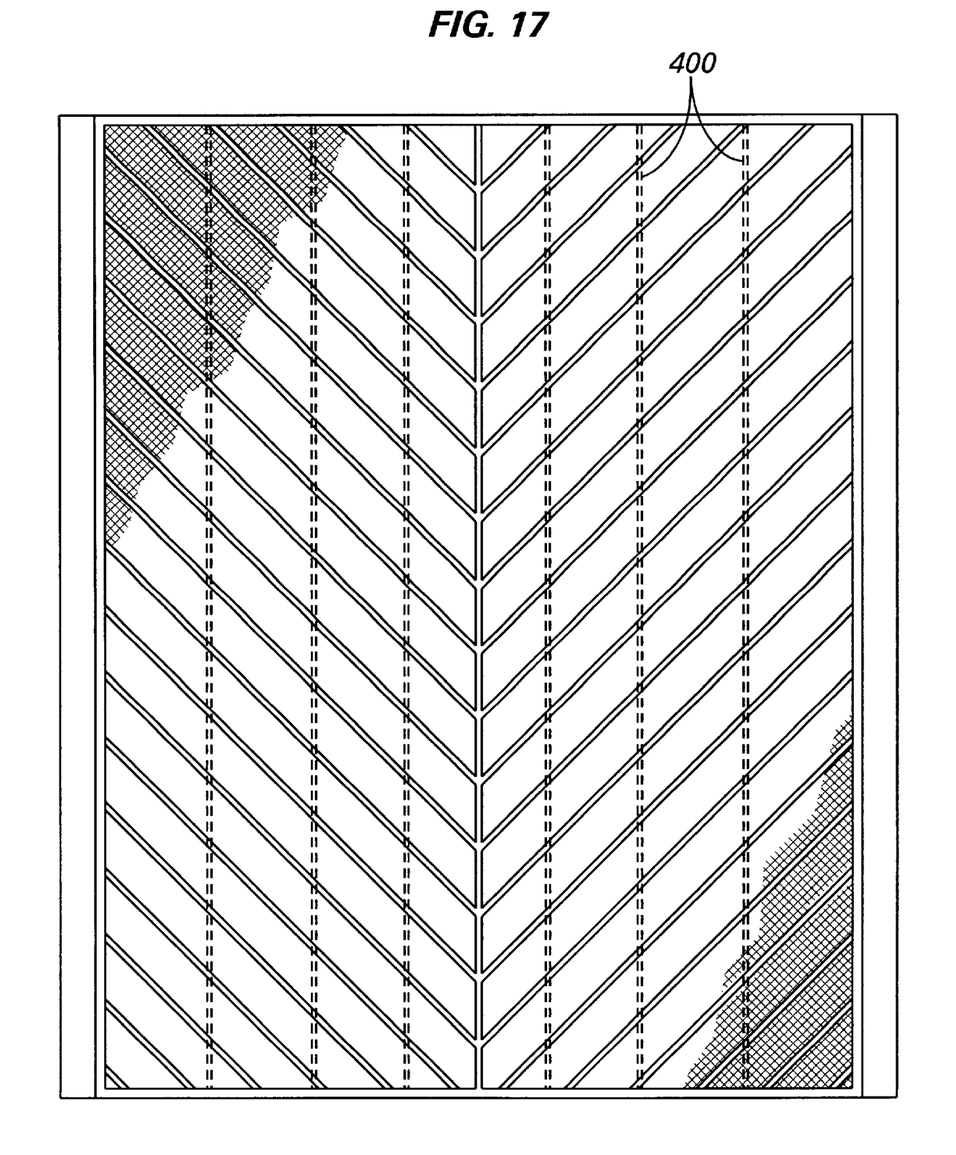
FIG. 17 is a plan view of a screen of a fourth embodiment of the present invention.

As seen in FIG. 17, a screen 1, 20, 40, 60 is provided with a rib rail cushioner support 400 within the screen's body. Plastic is heat melted and laminated to form rib cushioner support 400. Rib Cushioner support 400 is positioned at the exact points in the screen's underside surface where the rib rail reinforcement of the shale shaker equipment (not shown) will make contact with the screen 1, 20, 40, 60. The plastic forms the continuous support 400 running the full length of each and every rib rail support (not shown) and thus the full length of the screen 1, 20, 40, 60. The rib cushion 400 protects the screen 1, 20, 40, 60 from premature wear due to cushion reinforcement wear on one extreme to failure to change cushion reinforcements on the other extreme. The rib cushion 400 provides a layer of protection to limit friction between the screen's underside and the equipment 100 ribs (not shown) that would also lead to premature screen 1, 20, 40, 60 wear and ultimately to screen failures. Thus, rib cushion 400 provides additional body support to the integrity of the screen 1, 20, 40, 60 to enhance screen life. The rib cushion 400 is a multi-purpose feature that can be used on all types and patterns of screens, including single layered or multi-layered laminated which can include pattern designs that are plain, square, rectangular, diagonal, circular, diamond and the like. By such reinforcement, the rib cushion 400 prevents drilled solids or cuttings from becoming located between the screens 1, 20, 40, 60 underside and the rib cushion tubes which will aggravate the screen distortion and lead to reduced screen life. Thus, the rib cushion 400 reduces the amount of time involved in changing worn screens. The re-entry of drilled solids into the circulation system is also reduced which results from worn or torn screens. Further, the rib cushions 400 increase the tensioning between the embodied rib cushions 400 to produce a more uniformly tensioned screen 1, 20, 40, 60, reducing the likelihood of a need in the screen tension problems commonly associated with reduced screen life.

Other and varying embodiments and uses of the inventive concept taught herein are possible, and therefore the details herein are to be interpreted as illustrative and not in a limiting sense.

What is claimed is:

1. A screen assembly for solids filtering for connection to vibratory equipment, having hooks for connecting to the vibratory equipment, comprising:

a screen having longitudinal edges;

a screen layer of said screen, having a screen surface and ending at longitudinal edges and lateral edges, one of said lateral edges forming the discharge end of said screen;

wherein said screen layer includes a fold at said discharge end, said fold extending downward from said screen surface.

2. The screen assembly of claim 1 wherein said fold is a 90-degree fold, said 90-degrees being between said fold and said screen surface.

3. The screen assembly of claim 2 wherein said fold extends approximately one inch from said screen surface.

4. The screen assembly of claim 1, wherein said screen includes at least one diagonal rib having a length on said screen surface ending at said longitudinal edges.

5. The screen assembly of claim 4, wherein at least one of said diagonal ribs includes a raised director rib.

6. The screen assembly of claim 5, wherein said raised director rib runs only for a portion of the length of the at least one diagonal rib.

7. A screen assembly for solids filtering for connection to vibratory equipment, having hooks connected to the vibratory equipment, comprising:
   a screen having longitudinal edges;
   a screen layer of said screen, having a screen surface and ending at longitudinal edges and lateral edges, one of said lateral edges forming the discharge end of said screen;
   wherein said screen layer includes a fold at said discharge end, said fold extending downward from said screen surface;
   diagonal ribs having a length on said screen surface and at least one raised director rib, said raised director rib being mounted on a corresponding one of said diagonal ribs;
   said at least one raised director rib runs only for a portion of the length of the corresponding one of said diagonal ribs.

8. The screen assembly of claim 7, wherein there are a plurality of said raised director ribs which are of equal length.

9. The screen assembly of claim 7, wherein there are a plurality of said raised director ribs which are not of equal length.

10. The screen assembly of claim 9, wherein said raised director ribs are of two lengths, raised director ribs of the longer length being upstream of raised director ribs of the shorter length.

11. The screen assembly of claim 9, wherein longer raised director ribs are interspersed with shorter raised director ribs.

12. A screen assembly for solids filtering from mud for connection to vibratory equipment, having hooks connected to the vibratory equipment, comprising:
   a screen having longitudinal edges and a discharge end;
   hooking clasps connected at a first end to the hooks and at a second end to one of said longitudinal edges;
   said screen including:
      a screen layer having said longitudinal edges;
      a set of diagonal ribs, said ribs covering a portion of said screen layer and including two opposing sets of diagonal ribs, each set having a series of spaced ribs of said screen layer and extending diagonally on said screen layer;
   wherein each of said sets has a first subset and a second subset of said diagonal ribs, said first subset having a first spacing between said ribs of said first subset and said second subset having a second spacing between said ribs of said second subset, said second spacing being larger than said first spacing, at least some of said second subset extending to said discharge end of said screen.

13. The screen assembly of claim 12 wherein there is further included a fold, said fold extending downward from one of said lateral edges.

14. The screen assembly of claim 12, wherein at least one of said diagonal ribs includes a raised director rib.

15. The screen assembly of claim 14, wherein said diagonal ribs have a length and said raised director rib runs only for a portion of the length of one of said diagonal ribs.

16. A screen assembly for solids filtering for connection to vibratory equipment, having hooks connected to the vibratory equipment, comprising:
   a screen having longitudinal edges and a discharge end;
   hooking clasps connected at a first end to the hooks and at a second end to one of said longitudinal edges;
   said screen including:
      a screen layer having said longitudinal edges;
      a set of flexible ribs, said ribs covering a portion of said screen layer and including two opposing sets of diagonal ribs, each set having a series of spaced ribs of said screen layer and extending in length diagonally on said screen layer;
   wherein each of said sets has a first subset and a second subset of said diagonal ribs, said first subset having a first spacing between said ribs of said first subset and said second subset having a second spacing between said ribs of said second subset, said second spacing being larger than said first spacing, at least some of said second subset extending to said discharge end of said screen;
   wherein said diagonal ribs include raised director ribs;
   wherein said raised director ribs run only for a portion of the length of said diagonal ribs;
   wherein each of said raised director ribs being mounted on a corresponding one of said diagonal ribs and each of said raised director ribs runs only for a portion of the length of the corresponding one of said diagonal ribs.

17. The screen assembly of claim 16, wherein said raised director ribs are of equal length.

18. The screen assembly of claim 16, wherein said raised director ribs are not of equal length.

19. The screen assembly of claim 18, wherein said raised director ribs are of two lengths, raised director ribs of the longer length being upstream of raised director ribs of the shorter length.

20. The screen assembly of claim 18, wherein longer raised director ribs are interspersed with shorter raised director ribs.

21. A screen assembly for solids filtering for connection to vibratory equipment, having hooks for connecting to the vibratory equipment, comprising:
   a screen having longitudinal edges;
   a screen layer of said screen, having a screen surface and ending at longitudinal edges and lateral edges, one of said lateral edges forming the discharge end of said screen;
   wherein said screen includes ribs mounted on said screen surface, and a portion of at least one of said ribs including a raised director rib.

22. The screen assembly of claim 21, wherein said raised director rib is made of polypropylene.

23. The screen assembly of claim 21, wherein said raised director rib is attached to the top of said at least one rib.

24. The screen assembly of claim 23, wherein said raised director rib is connected to said at least one rib by fusion welding.

25. The screen assembly of claim 21, wherein said raised director rib has a height of 3/16 inch to 1/4 inch.

26. The screen assembly of claim 21, wherein said raised director rib is made of high temperature, oil resistant polypropylene.

27. A screen assembly for solids filtering for connection to vibratory equipment, having hooks connected to the vibratory equipment, comprising:
- a screen having longitudinal edges;
- a screen layer of said screen, having a screen surface and ending at longitudinal edges and lateral edges, one of said lateral edges forming the discharge end of said screen;
- wherein said screen includes first ribs affixed on said screen surface, and a portion of at least one of said first ribs including a raised director rib mounted on said one of said first ribs.

28. The screen assembly of claim 27, wherein there are a plurality of raised director ribs, said raised director ribs being of equal length.

29. The screen assembly of claim 27, wherein there are a plurality of raised director ribs, said raised director ribs not being of equal length.

30. The screen assembly of claim 29, wherein said raised director ribs are of two lengths, raised director ribs of the longer length being upstream of raised director ribs of the shorter length.

31. The screen assembly of claim 29, wherein longer raised director ribs are interspersed with shorter raised director ribs.

32. A screen assembly for solids filtering for connection to vibratory equipment, having hooks connected to the vibratory equipment, comprising:
- a screen having longitudinal edges;
- a screen layer of said screen, having a screen surface and ending at longitudinal edges and lateral edges, one of said lateral edges forming the discharge end of said screen;
- wherein said screen layer includes first ribs and a fold at said discharge end, said fold extending downward from said screen surface;
- wherein at least one of said first ribs includes a raised director rib.

33. The screen assembly of claim 32, wherein said at least one first rib has a length and said raised director rib runs only for a portion of the length of said at least one first rib.

34. The screen assembly at claim 32 wherein said first ribs are diagonal ribs.

35. A screen assembly for solids filtering for connection to vibratory equipment, having hooks connected to the vibratory equipment, comprising:
- a screen having longitudinal edges;
- a screen layer of said screen, having a screen surface and ending at longitudinal edges and lateral edges, one of said lateral edges forming the discharge end of said screen;
- wherein said screen layer includes first ribs having a length and a fold at said discharge end, said fold extending downward from said screen surface;
- wherein at least one of said first ribs includes a raised director rib;
- wherein said raised director rib runs only for a portion of the length of at least one of said first ribs;
- wherein there is more than one raised director rib, each of said raised director ribs being mounted on one of said first ribs and each of said raised director ribs runs only for a portion of the length of said corresponding first rib.

36. The screen assembly of claim 35, wherein said raised director ribs are of equal length.

37. The screen assembly of claim 35, wherein said raised director ribs are not the same length.

38. The screen assembly of claim 37, wherein said raised director ribs are of two lengths, raised director ribs of the longer length being upstream of raised director ribs of the shorter length.

39. The screen assembly of claim 38, wherein longer raised director ribs are interspersed with shorter raised director ribs.

40. The screen assembly of claim 35, wherein at least two of said raised director ribs are adjacent and there is a gate between said adjacent raised director ribs, forming a flow path.

41. The screen assembly of claim 40, wherein there is a first rib juxtaposed to said gate, said juxtaposed first rib includes a raised director rib in said flow path.

42. A screen assembly for solids filtering for connection to vibratory equipment, having hooks connected to the vibratory equipment, comprising:
- a screen having longitudinal edges and a discharge end;
- hooking clasps connected at a first end to the hooks and at a second end to one of said longitudinal edges;
- said screen including:
  - a screen layer having said longitudinal edges;
  - a set of flexible ribs not parallel to said longitudinal edges, said flexible ribs covering a portion of said screen layer;
  - wherein at least one of said flexible ribs includes a raised director rib.

43. The screen assembly of claim 42, wherein at least one flexible rib has a length and said raised director rib runs only for a portion of the length of said at least one flexible rib.

44. The screen assembly of claim 42, wherein there is more than one raised director ribs on said at least one flexible rib, at least two of said raised director ribs being mounted such that they form an opening there between on said at least one flexible rib.

45. The screen assembly of claim 44, wherein said raised director ribs are mounted on the same flexible rib and are of equal length.

46. The screen assembly of claim 44, wherein said raised director ribs are mounted on the same flexible rib and are not of equal length.

47. The screen assembly of claim 42, wherein said flexible ribs are diagonal ribs.

* * * * *